US008712220B2

(12) United States Patent
Shuto

(10) Patent No.: US 8,712,220 B2
(45) Date of Patent: Apr. 29, 2014

(54) VIDEO REPRODUCING APPARATUS AND VIDEO REPRODUCING METHOD

(75) Inventor: Eita Shuto, Setagaya-ku (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1610 days.

(21) Appl. No.: 11/832,902

(22) Filed: Aug. 2, 2007

(65) Prior Publication Data

US 2008/0181579 A1 Jul. 31, 2008

(30) Foreign Application Priority Data

Oct. 20, 2006 (JP) .................. 2006-286593

(51) Int. Cl.
| | |
|---|---|
| H04N 5/93 | (2006.01) |
| H04N 5/76 | (2006.01) |
| H04N 5/775 | (2006.01) |
| H04N 5/917 | (2006.01) |
| H04N 9/64 | (2006.01) |
| H04N 9/74 | (2006.01) |
| H04N 9/80 | (2006.01) |
| H04N 11/02 | (2006.01) |
| G06F 17/30 | (2006.01) |

(52) U.S. Cl.
USPC ........... 386/278; 386/230; 386/239; 386/240; 386/243; 386/280; 386/291; 386/356; 348/575; 348/699; 375/240.01; 375/240.05; 375/240.08; 375/240.15; 707/705; 707/823; 726/26

(58) Field of Classification Search
USPC ............ 386/278, 230, 243, 280, 356, E5.015, 386/239, 240, 291; 345/422; 348/699, 575; 375/240.01, 240.05, 240.15, E7.211, 375/240.08, E7.006; 726/26; G9B/27.019, G9B/27.051; 382/232; 707/705, 823, 999.01
See application file for complete search history.

(56) References Cited

U.S. PATENT DOCUMENTS

| | | | | |
|---|---|---|---|---|
| 5,457,675 | A | * | 10/1995 | Suzuki et al. ............... 386/353 |
| 6,539,054 | B1 | * | 3/2003 | Matsui et al. ............ 375/240.08 |
| 7,657,538 | B2 | * | 2/2010 | Shibata et al. ............ 707/999.01 |
| 2005/0149751 | A1 | * | 7/2005 | Ochi et al. .................... 713/200 |
| 2006/0177199 | A1 | | 8/2006 | Horiguchi et al. |
| 2007/0002045 | A1 | * | 1/2007 | Finger et al. .................. 345/422 |
| 2010/0067876 | A1 | | 3/2010 | McCrossan et al. |

FOREIGN PATENT DOCUMENTS

| | | |
|---|---|---|
| JP | 2003527002 | 9/2003 |
| JP | 2006-134520 | 5/2006 |
| JP | 2006221750 | 8/2006 |
| JP | 2006246496 | 9/2006 |
| WO | 0169923 | 9/2001 |

OTHER PUBLICATIONS

Japanese Patent Application No. 2006-286593, Notice of Rejection, mailed Apr. 5, 2011, (English Translation).

\* cited by examiner

*Primary Examiner* — Thai Tran
*Assistant Examiner* — Syed Hasan
(74) *Attorney, Agent, or Firm* — Blakely, Sokoloff, Taylor & Zafman LLP

(57) ABSTRACT

According to one embodiment, a video reproducing apparatus includes a video data generating device generating reproduction control video data for displaying a reproduction control image of video contents in a constant cycle on an occasion of reproducing the video contents; and
an update cycle adjusting device making an update cycle in which the reproduction control video data is updated longer than the constant cycle, within a range in which all the reproduction control images which should be displayed by the reproduction control video data are displayed.

17 Claims, 4 Drawing Sheets

VIDEO REPRODUCING APPARATUS AND VIDEO REPRODUCING METHOD

CROSS-REFERENCE TO RELATED APPLICATIONS

This application is based upon and claims the benefit of priority from Japanese Patent Application No. 2006-286593, filed Oct. 20, 2006, the entire contents of which are incorporated herein by reference.

BACKGROUND

1. Field

One embodiment of the invention relates to a video reproducing apparatus and a video reproducing method reproducing video contents recorded in a recording medium such as, for example, an HD DVD (High Definition Digital Versatile Disc).

2. Description of the Related Art

As a video reproducing apparatus and a video reproducing method of the above described technical field, an art of generating various planes such as a graphics plane and a main video plane, and reproducing video contents by superimposing these planes is known (see, for example, Japanese Patent Application Publication (KOKAI) No. 2006-134520). Here, a graphics plane is image data for reproduction control for displaying reproduction control images of video contents and generating events (for example, a menu control, a title jump and the like).

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Figure 1:
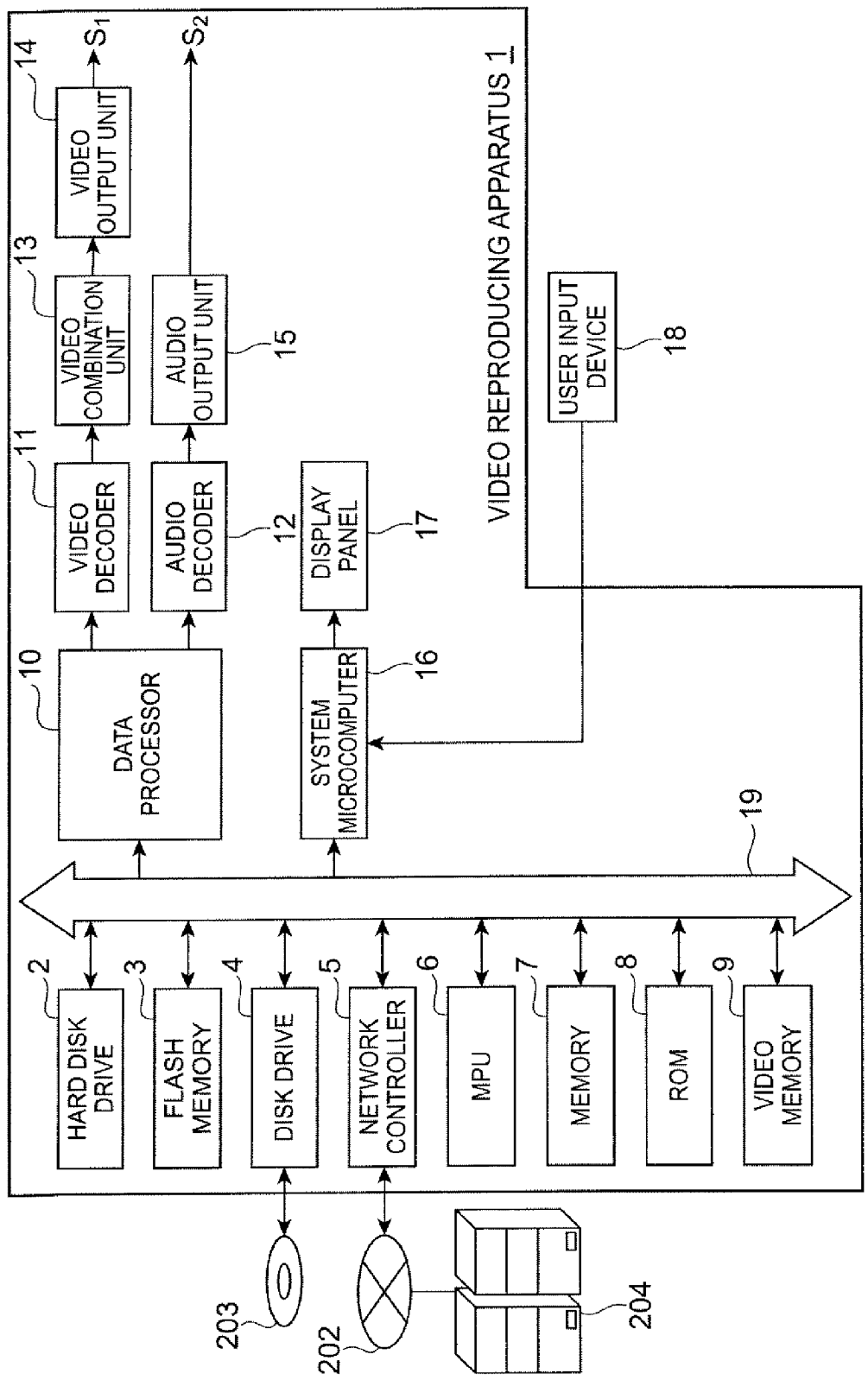
FIG. 1 is an exemplary block diagram showing an internal configuration of a video reproducing apparatus according to a first embodiment of the invention.
Figure 2:
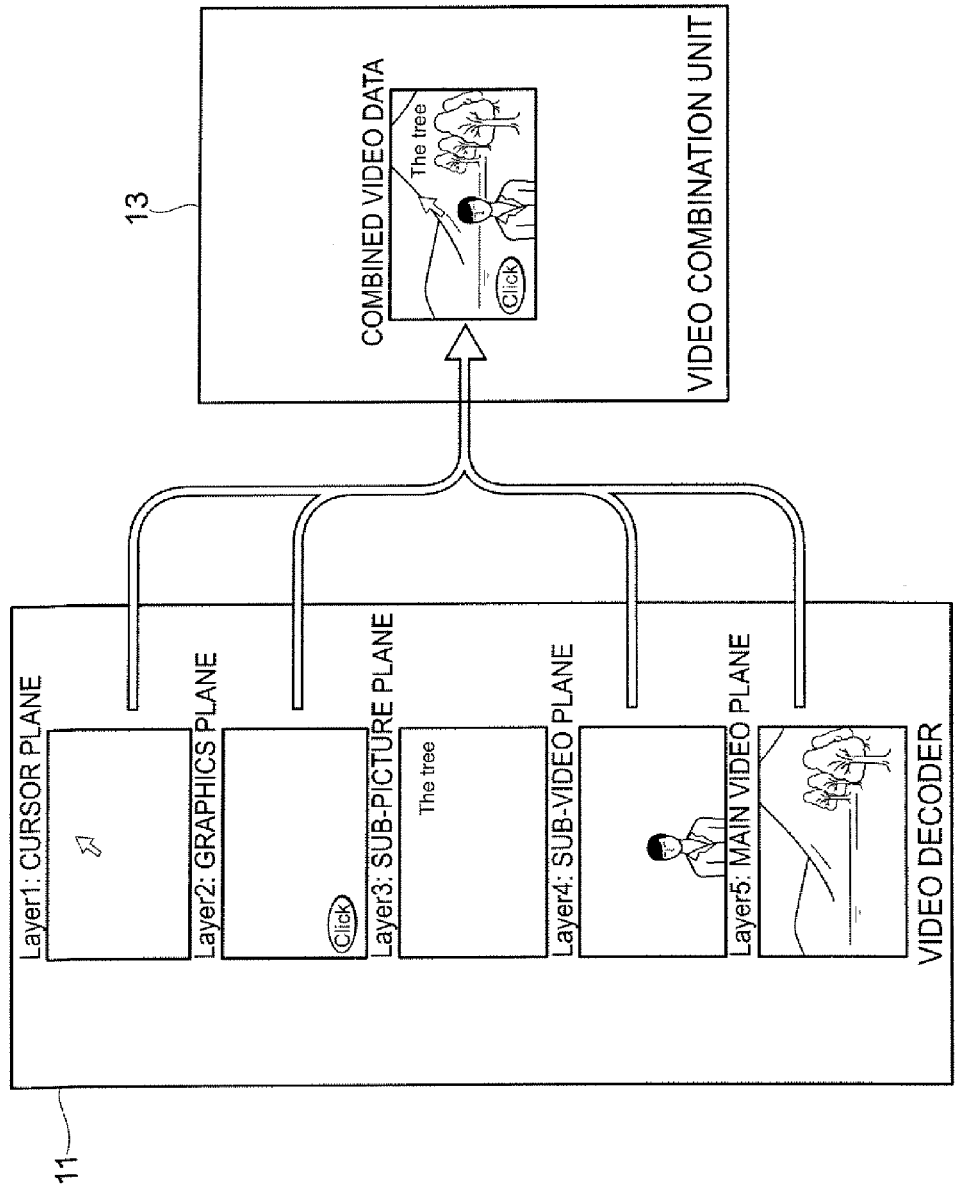
FIG. 2 is an exemplary conceptual diagram for explaining the functions of a video decoder and a video combination unit of the video reproducing apparatus shown in FIG. 1 in the embodiment.

Various embodiments according to the invention will be described hereinafter with reference to the accompanying drawings. In general, according to one embodiment of the invention, a video reproducing apparatus includes a video data generating device generating reproduction control video data for displaying a reproduction control image of video contents in a constant cycle on an occasion of reproducing the video contents; and an update cycle adjusting device making an update cycle in which the reproduction control video data is updated longer than the constant cycle, within a range in which all the reproduction control images which should be displayed by the reproduction control video data are displayed.

Hereinafter, a preferred embodiment of the present invention will be described in detail with reference to the drawings. In each of the drawings, the same or equivalent portions are assigned with the same reference numerals and characters, and the redundant explanation will be omitted.

First Embodiment

As shown in FIG. 1, a video reproducing apparatus 1 can read video content data in a digital format recorded in a recording medium 203 such as an HD DVD, and reproduce video contents (for example, movies, dramas or the like) and interactive data. Further, the video reproducing apparatus 1 can be connected to a network storage 204 through the Internet 202, can also acquire video content data from the network storage 204 and reproduce video contents and interactive data.

The video reproducing apparatus 1 has a hard disk drive 2, a flash memory 3, a disk drive 4 and a network controller 5, and all of them are connected to a bus 19. The hard disk drive 2 records digital data such as video content data in a magnetic disk which rotates at a high speed, and reads and writes the digital data. The flash memory 3 stores digital data such as video content data, and the digital data is read from and written to the flash memory 3. The disk drive 4 has the function of reading digital data such as video content data from the recording medium 203 and outputting reproduction signals. The network controller 5 controls read and write of digital data such as video content data which are performed from and to the network storage 204 through the Internet 202.

The video reproducing apparatus 1 has an MPU (Micro Processing Unit) 6, a memory 7, a ROM 8 and a video memory 9, and all of them are connected to the bus 19. The MPU 6 is started in accordance with a boot program read from the ROM 8 to the memory 7. Further, the MPU 6 instructs a later-described data processor 10 to reproduce a video and a sound by using video content data read from any of the recording medium 203, the network storage 204, the hard disk drive 2 and the flash memory 3. The memory 7 stores data and a program used when the MPU 6 is operated. The ROM 8 stores programs (for example, a boot program and the like) executed by the MPU 6 and permanent data. Decoded video data are sequentially written into the video memory 9.

Further, the video reproducing apparatus 1 has a data processor (update cycle adjusting device) 10, a video decoder (video data generating device) 1, an audio decoder 12, a video combination unit 13, a video output unit 14 and an audio output unit 15. The data processor 10 executes a moving image/sound reproduction program in response to an instruction of the MPU 6 which is inputted therein through the bus 19, separates the video content data read from any of the recording medium 203, the network storage 204, the hard disk drive 2 and the flash memory 3, supplies moving image data to the video decoder 11, and supplies audio data to the audio decoder 12.

The video decoder 11 decodes moving image data supplied from the data processor 10 and converts it into video data and supplies the video data to the video combination unit 13. The video combination unit 13 performs combination processing of the video data supplied from the video decoder 11 to generate combined video data, and supplies the generated combined video data to the video output unit 14. The video output unit 14 outputs a video output signal S1 corresponding to the supplied combined video data.

For example, when the video reproducing apparatus 1 reads video content data recorded in the recording medium 203 which is the HD DVD and reproduces video contents, the video decoder 11 generates a cursor plane for displaying a cursor, a graphics plane for displaying a reproduction control image of the video contents, a sub-picture plane for displaying a sub-picture or the like, a sub-video plane and a main video plane as video data in a fixed cycle (for example, a cycle of 1/60 seconds). The video combination unit 13 superimposes the five planes generated by the video decoder 11 in the sequence of Layer 1 to Layer 5, and generates combined video data.

As shown in FIG. 1, the audio decoder 12 decodes audio data supplied from the data processor 10, and supplies the decoded audio data to the audio output unit 15. The audio output unit 15 outputs an audio output signal S2 corresponding to the supplied audio data.

Further, the video reproducing apparatus 1 has a system microcomputer 16 and a display panel 17. The system microcomputer 16 displays various kinds of information relating to reproduction of video contents and interactive data (reproduction information) on the display panel 17, and inputs an operation input signal which is inputted therein from a user input device 18 (a device enabling operation input such as a remote controller or an operation button included by the video reproducing apparatus 1) into the MPU 6 through the bus 19. The display panel 17 has a liquid crystal display panel, and displays reproduction information on the liquid crystal display panel in accordance with the instruction of the system microcomputer 16.

Next, generation processing of the aforementioned graphics plane will be described in more detail. A graphics plane is image data for reproduction control for displaying a reproduction control image of video contents, and generating events (for example, a menu control, a title jump and the like).

For example, when the video reproducing apparatus 1 reads the video content data recorded in the recording medium 203 which is the HD DVD and reproduces video contents, the graphics planes is generated by the video decoder 11 in the above described constant cycle, based on a DOM (Document Object Model) which is updated in an update cycle (for example, a cycle of 1/60 seconds) equal to the above described constant cycle by the data processor 10.

Update of the DOM by the data processor 10 exerts high load onto the MPU 6 and becomes a main cause of reduction in performance of the video reproducing apparatus 1. Therefore, if the update cycle is made longer to be 1/5 seconds from 1/60 seconds, for example, and the number of updates of the DOM by the data processor 10 is decreased, performance of the video reproducing apparatus 1 can be enhanced. However, if the update cycle becomes longer than the time corresponding to the shortest event duration among all event durations (corresponding to the duration time of the reproduction control image) shown in a markup language displayed by the recording medium 203 which is the HD DVD, the reproduction control image is not displayed due to frame omission of the graphics plane for displaying a predetermined reproduction control image, and a predetermined event is unlikely to be generated.

Figure 3:
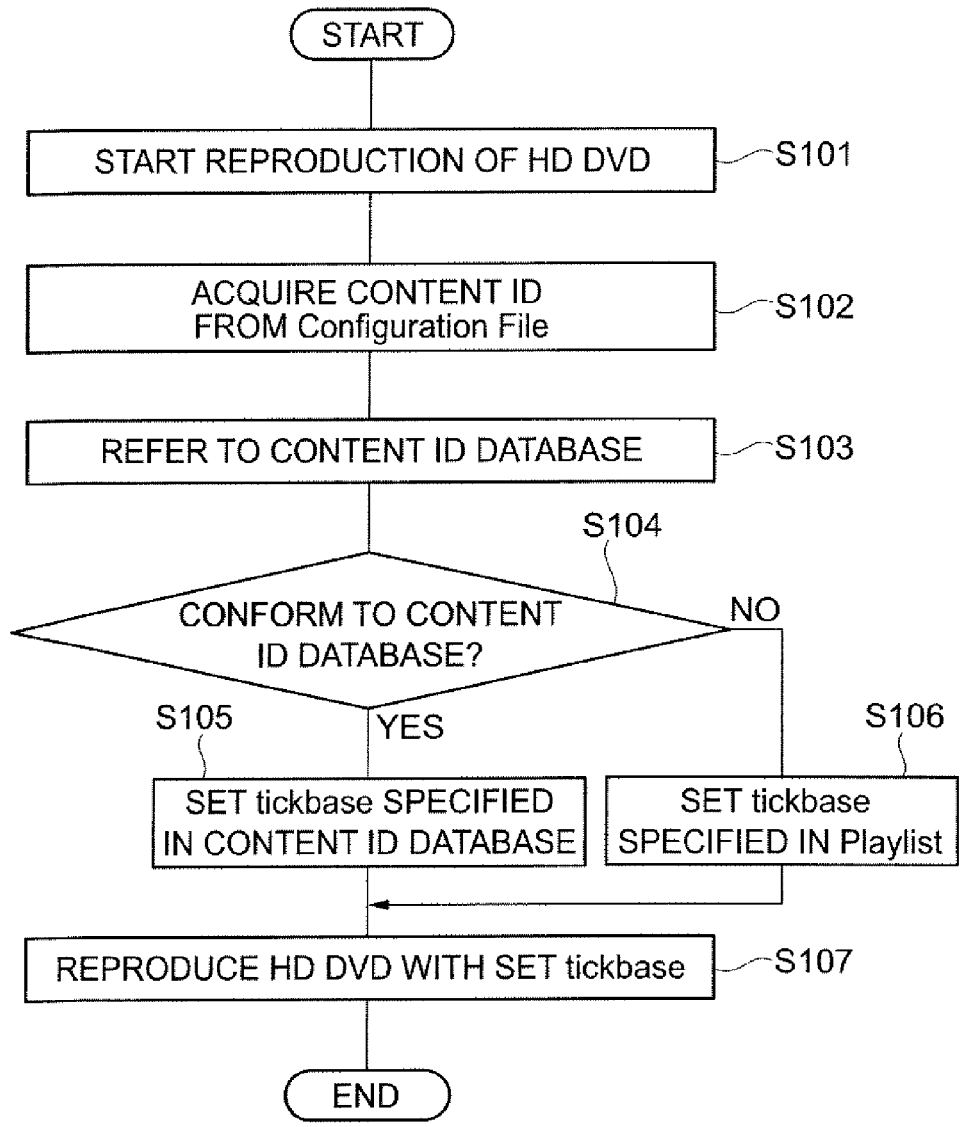
FIG. 3 is an exemplary flowchart showing a procedure of reproducing processing of video contents executed in the video reproducing apparatus in the first embodiment.

Thus, in the video reproducing apparatus 1, reproduction processing of video contents as shown in FIG. 3 is executed.

When reproduction of the video contents recorded in the recording medium 203 which is the HD DVD is started first (block S101), a content ID is acquired from a Configuration File by the data processor 10 (block S102). Here, the content ID is an ID uniquely determined for each title of the video contents (for example, movies, dramas and the like).

Subsequently, reference to a content ID database is performed by the data processor 10 (block S103). The content ID database is stored in the data processor 10, and time corresponding to the shortest event duration among all the event durations shown in a markup language displayed by the recording medium 203 which is the HD DVD is described for each content ID in the content ID database. Specifically, the data processor 10 has time determined in accordance with content IDs for each of the content IDs as a database.

Subsequently, it is determined by the data processor 10 whether or not the content ID acquired in block S102 is present in the content ID database, specifically, whether or not the content ID acquired in block S102 conforms to the content ID database (block S104).

As a result, when the content ID acquired in block S102 is present in the content ID database, the update cycle is made longer than the above described constant cycle (that is, a constant cycle (for example, 1/60 seconds) in which the video decoder 11 generates a graphics plane) by the data processor 10 so that the update cycle becomes the time (for example, 1/15 seconds) decided in accordance with the content ID acquired in block S102. Specifically, a tickbase specified in the content ID database (information showing the number of frames of the graphics plane generated per one second by the video decoder 11 (for example, 15 frames/second) based on the DOM updated by the data processor 10) is set by the data processor 10 (block S105).

When the content ID acquired in block S102 is not present in the content ID database on the other hand, setting of the update cycle (for example, 1/60 seconds) equal to the above described constant cycle, specifically, setting of the tickbase (for example, 60 frames/second) specified in the Playlist is performed by the data processor 10 (block S106).

The video contents recorded in the recording medium 203 which is the HD DVD is reproduced with the set tickbase (block S107).

As described above, in the video reproducing apparatus 1 according to the first embodiment, the update cycle is made longer than the constant cycle in which the video decoder 11 generates the graphics plane so that the update cycle becomes the time corresponding to the shortest event duration among all the event durations shown in the markup language displayed by the recording medium 203 which is the HD DVD. Thereby, the number of updates of the DOM by the data processor 10 decreases, and therefore, performance of the video reproducing apparatus 1 can be enhanced. Further, the update cycle is not made longer than the time corresponding to the shortest event duration among all the event durations shown in the markup language displayed by the recording medium 203 which is the HD DVD, and therefore, the situation in which some of the reproduction control images which should be displayed by the graphics plane are not displayed and some of the events are not generated can be prevented.

The number of updates of the DOM by the data processor 10 decreases, and therefore, even the video reproducing apparatus with low capacity can reproduce the video contents recorded in the recording medium 203 which is the HD and DVD.

Second Embodiment

Figure 4:
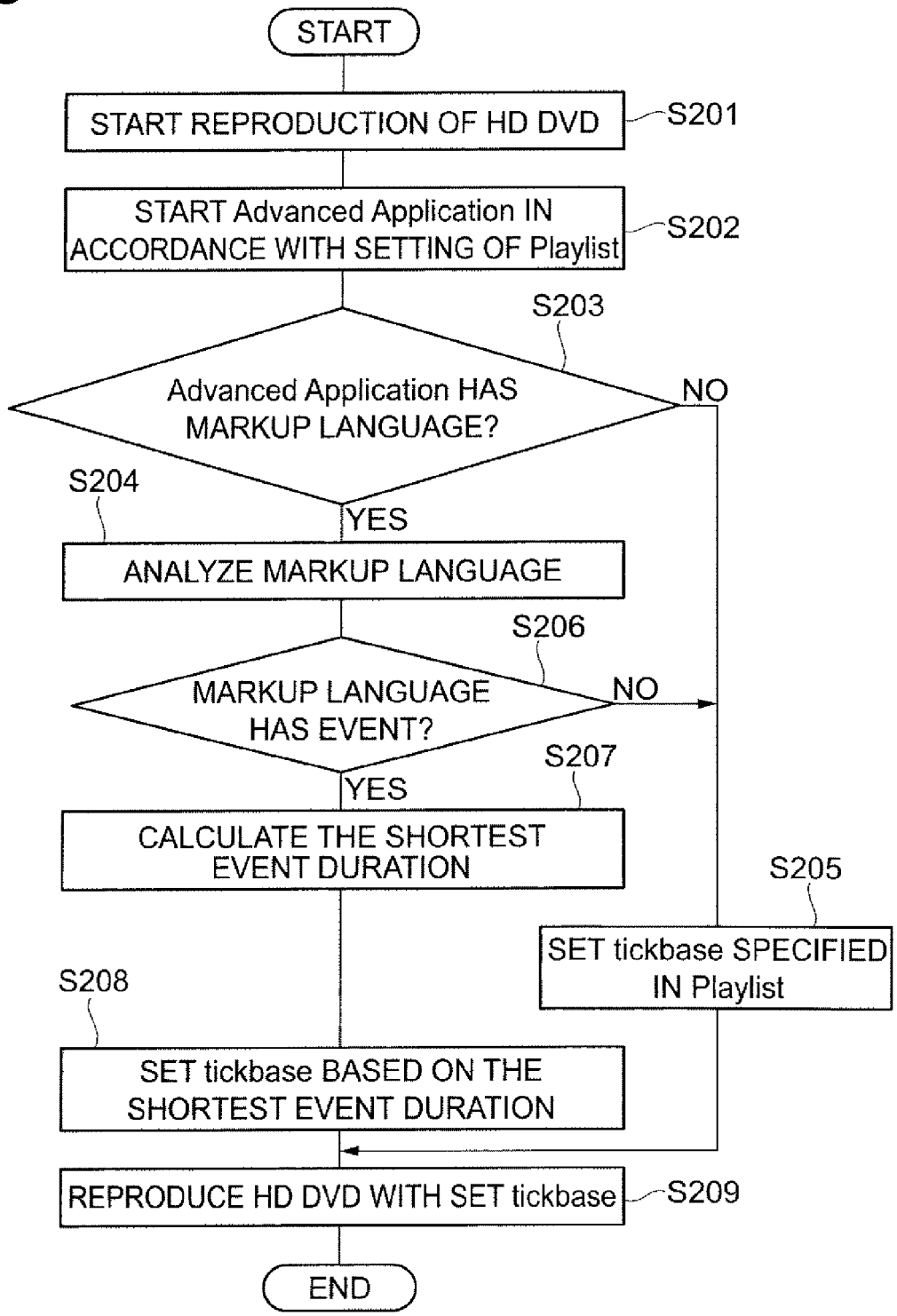
FIG. 4 is an exemplary flowchart showing a procedure of reproducing processing of video contents executed in a video reproducing apparatus according to a second embodiment.

The video reproducing apparatus 1 according to a second embodiment differs from the video reproducing apparatus 1 according to the above described first embodiment in the respect that reproducing processing of video contents as shown in FIG. 4 is executed.

When reproduction of the video contents recorded in the recording medium 203 which is the HD DVD is started first (block S201), Advanced Application is started in accordance with setting of the Playlist (block S202), and it is determined whether or not the Advanced Application has a markup language to be displayed by the data processor 10 (block S203).

When the Advanced Application has the markup language to be displayed as a result, analysis of the markup language is performed by the data processor 10 (block S204), and it is determined whether or not the markup language has an event (block S206).

When the markup language has the event as a result, the time corresponding to the shortest event duration among all the event durations shown in the markup language displayed by the HD DVD is calculated (block S207). The update cycle is made longer than the constant cycle (that is, the constant cycle in which the video decoder 11 generates a graphics plane (for example, 1/60 seconds)) by the data processor 10 so that the update cycle becomes the calculated time (for example, 1/15 seconds). Specifically, a tickbase (for example, 15 frames/second) based on the shortest event duration is set by the data processor 10 (block S208).

When the Advanced Application does not have the markup language to be displayed as a result of determination of block S203, and when the markup language does not have an event as a result of block S206, setting of the update cycle (for example, 1/60 seconds) equal to the above described fixed cycle, that is, setting of the tickbase specified in the Playlist (for example, 60 frames/second) is performed by the data processor 10 (block S205).

Then, reproduction of the video content recorded in the recording medium 203 which is the HD DVD is performed with the set tickbase.

As described above, in the video reproducing apparatus 1 according to the second embodiment, the update cycle is also made longer than the constant cycle in which the video decoder 11 generates the graphics plane so that the update cycle becomes the time corresponding to the shortest event duration among all the event durations shown in the markup language displayed by the recording medium 203 which is the HD DVD. Accordingly, performance of the video reproducing apparatus 1 can be enhanced, and the situation in which some of the reproduction control images which should be displayed by the graphics plane are not displayed and some of the events are not generated can be prevented.

The present invention is not limited to the aforementioned first and second embodiments.

For example, the unique identifier other than the content ID may be applied. In place of the unique identifier such as the content ID, a provider ID, and the copyright protection technology information such as AACS Hash of the recording medium 203 which is the HD DVD may be applied. In these cases, performance of the video reproducing apparatus 1 can also be enhanced, and the situation in which some of the reproduction control images which should be displayed by the graphics plane are not displayed and some of the events are not generated can be prevented. Here, the provider ID is an ID uniquely specified for each provider of video contents. AACS Hash is a Hash value indicating that the video contents are not tampered in AACS (Advanced Access Content System).

After the data processor 10 makes the update cycle longer the constant cycle in which the video decoder 11 generates the graphics plane, if the update cycle is longer than the time corresponding to the shortest event duration among all the event durations shown in the markup language displayed by the recording medium 203 which is the HD DVD, the data processor 10 may change the time corresponding to the shortest event duration to the update cycle. Thereby, the situation in which some of the reproduction control images which should be displayed by the graphics plane are not displayed and some of the events are not generated can be prevented more reliably.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A video reproducing apparatus, comprising:
   a generator configured to generate reproduction control video data for displaying a reproduction control image of video contents in a constant cycle on an occasion of reproducing the video contents; and
   an adjuster configured to alter an update cycle in which the reproduction control video data is updated to have a duration longer than the constant cycle, within a range in which all of the reproduction control images which should be displayed by the reproduction control video data are displayed,
   wherein the adjuster is configured to store, in advance, a time corresponding to a shortest duration time among duration times of reproduction control images displayed by a recording medium in which the video contents are recorded, in association with each of unique content identifiers of the video contents recorded in the recording medium, and
   wherein the adjuster is configured to refer to the time corresponding to the shortest duration time stored in association with a corresponding one of the unique content identifiers to make the update cycle longer than the constant cycle so that the update cycle becomes the time stored in association with the corresponding one of the unique content identifiers.

2. The video reproducing apparatus according to claim 1, wherein said update cycle adjusting device has the time determined in accordance with the unique identifiers for each of the unique identifiers as a database.

3. The video reproducing apparatus according to claim 1, wherein said update cycle adjusting device makes the update cycle longer than the constant cycle so that the update cycle becomes time determined in accordance with provider IDs of a recording medium in which the video contents are recorded.

4. The video reproducing apparatus according to claim 3, wherein said update cycle adjusting device has the time determined in accordance with the provider IDs for each of the provider IDs as a database.

5. The video reproducing apparatus according to claim 1, wherein said update cycle adjusting device makes the update cycle longer than the constant cycle so that the update cycle becomes time determined in accordance with copyright protection technology information of a recording medium in which the video contents are recorded.

6. The video reproducing apparatus according to claim 5, wherein said update cycle adjusting device has the time determined in accordance with the copyright protection technology information for each of the copyright protection technology information as a database.

7. The video reproducing apparatus according to claim 1, wherein said update cycle adjusting device makes the update cycle longer than the constant cycle so that the update cycle becomes a shortest duration time among duration times of all the reproduction control images shown in a markup language displayed by a recording medium in which the video contents are recorded.

8. The video reproducing apparatus according to claim 1, wherein said update cycle adjusting device changes a shortest duration time to the update cycle when the update cycle is longer than the shortest duration time among duration times of all the reproduction control images shown in a markup language displayed by a recording medium in which the video contents are recorded after said update cycle adjusting device makes the update cycle longer than the constant cycle.

9. A video reproducing method, comprising:

generating reproduction control video data for displaying a reproduction control image of video contents in a constant cycle on an occasion of reproducing the video contents; and increasing, by an adjuster, a duration of an update cycle in which the reproduction control video data is updated to be more than the constant cycle within a range in which all the reproduction control images which should be displayed by the reproduction control video data are displayed, wherein the adjuster is configured to store, in advance, a time corresponding to a shortest duration time among duration times of reproduction control images displayed by a recording medium in which the video contents are recorded, in association with each of unique content identifiers of the video contents recorded in the recording medium, and wherein the adjuster is configured to refer to the time corresponding to the shortest duration time stored in association with a corresponding one of the unique content identifiers to make the update cycle longer in duration than the constant cycle so that the update cycle becomes the time stored in association with the corresponding one of the unique content identifiers.

10. The video reproducing method according to claim 9, wherein the update cycle has the time determined in accordance with the unique identifiers for each of the unique identifiers as a database.

11. The video reproducing method according to claim 9, wherein the duration of the update cycle is increased to be longer than the constant cycle so that the update cycle becomes time determined in accordance with provider identifiers of a recording medium in which the video contents are recorded.

12. The video reproducing method according to claim 11, wherein the update cycle has the time determined in accordance with the provider identifiers for each of the provider identifiers as a database.

13. The video reproducing method according to claim 9, wherein the duration of the update cycle is longer than the constant cycle so that the update cycle becomes time determined in accordance with copyright protection technology information of a recording medium in which the video contents are recorded.

14. The video reproducing method according to claim 13, wherein said update cycle has the time determined in accordance with the copyright protection technology information for each of the copyright protection technology information as a database.

15. The video reproducing method according to claim 9, wherein the duration of the update cycle is longer than the constant cycle so that the update cycle becomes a shortest duration time among duration times of all the reproduction control images shown in a markup language displayed by a recording medium in which the video contents are recorded.

16. The video reproducing method according to claim 9, wherein the duration of the update cycle is adjusted to a shortest duration time when the update cycle is longer than the shortest duration time among duration times of all the reproduction control images shown in a markup language displayed by a recording medium in which the video contents are recorded after the duration of the update cycle is adjusted to be longer in duration than the constant cycle.

17. A video reproducing apparatus, comprising:

a generator configured to generate reproduction control video data for displaying a reproduction control image of video contents in a constant cycle on an occasion of reproducing the video contents; and a processor coupled to the video decoder, the processor to alter an update cycle in which the reproduction control video data is updated to have a duration longer than the constant cycle, within a range in which all of the reproduction control images which should be displayed by the reproduction control video data are displayed, wherein the processor is configured to store, in advance, a time corresponding to a shortest duration time among duration times of reproduction control images displayed by a recording medium in which the video contents are recorded, in association with each of unique content identifiers of the video contents recorded in the recording medium, and wherein the processor is configured to refer to the time corresponding to the shortest duration time stored in association with a corresponding one of the unique content identifiers to make the update cycle longer than the constant cycle so that the update cycle becomes the time stored in association with the corresponding one of the unique content identifiers.

* * * * *